US011678197B2

(12) United States Patent
Narayanan et al.

(10) Patent No.: US 11,678,197 B2
(45) Date of Patent: *Jun. 13, 2023

(54) FLEXIBLE GATEWAY FOR HETEROGENEOUS-DEVICE MANAGEMENT

(71) Applicant: ARRIS Enterprises LLC, Suwanee, GA (US)

(72) Inventors: Dileepan Narayanan, Fremont, CA (US); Sudhakar Swaminathan, San Jose, CA (US); Dinesh Raman, Fremont, CA (US); Siby Mathew Tarigopla Pacras, San Jose, CA (US); Yogesh Ranade, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 437 days.

This patent is subject to a terminal disclaimer.

(21) Appl. No.: 16/749,022

(22) Filed: Jan. 22, 2020

(65) Prior Publication Data

US 2020/0162933 A1 May 21, 2020

Related U.S. Application Data

(63) Continuation of application No. 16/185,002, filed on Nov. 8, 2018, now Pat. No. 10,582,394.
(Continued)

(51) Int. Cl.
*H04W 48/16* (2009.01)
*H04W 16/14* (2009.01)
(Continued)

(52) U.S. Cl.
CPC ............ *H04W 16/14* (2013.01); *H04L 69/18* (2013.01); *H04W 16/16* (2013.01); *H04W 48/16* (2013.01);
(Continued)

(58) Field of Classification Search
CPC ............ H04M 1/6066; H04M 1/7253; H04M 1/72522; H04M 1/72527; H04M 1/72569;
(Continued)

(56) References Cited

U.S. PATENT DOCUMENTS 5,712,624 A    1/1998  Ayerst
8,411,692 B2   4/2013  Patil
(Continued)

FOREIGN PATENT DOCUMENTS

EP    3211937    8/2017    ............. H04L 45/02

OTHER PUBLICATIONS

Extended European Search Report, RE: Application No. 18206547.4, dated Jan. 15, 2019.
(Continued)

*Primary Examiner* — Michael T Vu
(74) *Attorney, Agent, or Firm* — Steven Stupp; Stewart Wiener

(57) ABSTRACT

An interface circuit in an electronic device may communicate using communication protocol in a shared band of frequencies. During operation, the interface circuit may perform a scan of available channels in the shared band of frequencies, and may detect one or more used channels in the shared band of frequencies that are reserved or used by another communication protocol (such as a primary channel that is used by both of the communication protocols). Alternatively, the interface circuit may receive, from another interface circuit in the electronic device, information specifying the one or more used channels in the shared band of frequencies that are reserved or used by the other communication protocol. Next, the interface circuit may mask the one or more used channels from the available channels, and
(Continued)

the interface circuit may select one or more channels from the remaining available channels for use with the communication protocol.

20 Claims, 11 Drawing Sheets

Related U.S. Application Data

(60) Provisional application No. 62/586,885, filed on Nov. 15, 2017.

(51) Int. Cl.
| | |
|---|---|
| *H04L 69/18* | (2022.01) |
| *H04W 48/18* | (2009.01) |
| *H04W 72/12* | (2023.01) |
| *H04W 74/08* | (2009.01) |
| *H04W 16/16* | (2009.01) |
| *H04W 88/16* | (2009.01) |
| *H04W 88/06* | (2009.01) |

(52) U.S. Cl.
CPC ....... *H04W 48/18* (2013.01); *H04W 72/1215* (2013.01); *H04W 74/0808* (2013.01); *H04W 88/06* (2013.01); *H04W 88/16* (2013.01)

(58) Field of Classification Search
CPC ........... H04M 1/72533; H04M 1/7255; H04M 1/72563; H04W 48/16; H04W 16/14; H04W 16/16; H04W 72/0453; H04L 69/18
See application file for complete search history.

(56) References Cited

U.S. PATENT DOCUMENTS

| | | | |
|---|---|---|---|
| 8,732,031 B2 | 5/2014 | Martin et al. | |
| 8,775,669 B2 | 7/2014 | Hutchinson | |
| 8,875,154 B2 | 10/2014 | Bhatia | |
| 9,407,573 B2 | 8/2016 | Horvath | |
| 9,577,773 B2 | 2/2017 | Solondz | |
| 9,924,424 B2 | 3/2018 | Chuberre | |
| 9,949,169 B2 | 4/2018 | Yerramalli | |
| 10,078,865 B2 | 9/2018 | Joshi et al. | |
| 10,582,394 B2 * | 3/2020 | Narayanan | H04W 48/16 |
| 2007/0064699 A1 | 3/2007 | Bernick | |
| 2008/0159208 A1 | 7/2008 | Kloker | |
| 2009/0190566 A1 * | 7/2009 | Kwon | H04W 74/02 370/345 |
| 2012/0106447 A1 | 5/2012 | Yousefi | |
| 2012/0270599 A1 | 10/2012 | Mori | |
| 2012/0327778 A1 | 12/2012 | Stanwood | |
| 2015/0146656 A1 | 5/2015 | Sun et al. | |
| 2016/0286251 A1 | 9/2016 | Kopka | |
| 2016/0366689 A1 | 12/2016 | Zhang | |
| 2017/0041859 A1 | 2/2017 | Martin et al. | |
| 2017/0126873 A1 | 5/2017 | McGary | |
| 2017/0171890 A1 * | 6/2017 | Gage | H04W 74/0875 |
| 2017/0202015 A1 | 7/2017 | Li et al. | |
| 2017/0311171 A1 | 10/2017 | Kurian et al. | |
| 2018/0167825 A1 | 6/2018 | Egner | |
| 2018/0184330 A1 | 6/2018 | Egner | |
| 2018/0206282 A1 | 7/2018 | Singh | |
| 2018/0302118 A1 | 10/2018 | Lim | |

OTHER PUBLICATIONS

European Patent Appl. No. 18206547.4, Office Action, dated Feb. 10, 2020.

* cited by examiner

FLEXIBLE GATEWAY FOR HETEROGENEOUS-DEVICE MANAGEMENT

CROSS REFERENCE TO RELATED APPLICATIONS

This application is a continuation under 35 U.S.C. § 120 of U.S. Non-Provisional application Ser. No. 16/185,002, entitled "Flexible Gateway for Heterogeneous-Device Management," by Dileepan Narayanan, et al., filed on Nov. 8, 2018, which claims priority under 35 U.S.C. § 119(e) to U.S. Provisional Application Ser. No. 62/586,885, entitled "Flexible Gateway for Heterogeneous-Device Management," by Dileepan Narayanan, et al., filed on Nov. 15, 2017, the contents of both of which are herein incorporated by reference.

BACKGROUND

Field

The described embodiments relate to techniques for communicating information among electronic devices. In particular, the described embodiments relate to techniques for facilitating an integrated Internet-of-things (IoT) system, including communication using different communication protocols and a programmable/configurable IoT services manager.

Related Art

The increasing capabilities of electronic devices are dramatically changing our lives. For example, the processing and communication capabilities of portable electronic devices, such as cellular telephones, provide users with the capabilities of a handheld computer. In conjunction with expanded networks, such as the cellular-telephone networks and the Internet, these capabilities are allowing individuals to: access vast amounts of information; identify and interact with other people, organizations and governments; access information at arbitrary locations; and perform a wide variety of tasks. Collectively, these technologies have resulted in a significant increase in economic activity (such as online financial transactions, which are sometimes referred to as 'ecommerce') and productivity, and enable a host of applications that enhance user experiences and quality of life.

Recently, it has been proposed that further advances can be achieved by enhancing the capabilities of other electronic devices, which are pervasive but largely ignored by most users (such as in appliances, infrastructure, transportation, farming, etc.). In particular, by embedding sensors, actuators and communication capabilities in these 'background' electronic devices, the so-called 'Internet of things' (IoT) can provide a distributed network that facilities the exchange of data, remote sensing and control, and a diverse set of applications that facilitate more direct integration of the physical world into computer-based system. In principle, the IoT offers the promise of highly automated systems that improve efficiency, enhance accuracy and expand economic activity in a diverse set of markets, such as: smart cities, hospitality, retail, education, housing, and manufacturing.

In practice, there are still obstacles to achieving the goals of the IoT. Notably, the IoT marketplace is diverse, with competing commercial entities offering devices/endpoints, networks, middleware and cloud-based platforms and services. Moreover, the marketplace lacks interoperability standards, which restricts communication and the exchange of data among components in these systems.

Consequently, the IoT remains fragmented and siloed, which forces users to purchase additional dedicated equipment (such as separate gateways for electronic devices from different manufacturers and providers, and/or additional network switches to connect to different cloud-based service providers) in an attempt to build integrated solutions. However, these efforts often result in custom and expensive solutions with redundant equipment and limited flexibility, all of which is frustrating to users and limits market traction of the IoT.

SUMMARY

A first group of described embodiments relates to an electronic device that provides concurrent communication using different communication protocols. This electronic device includes one or more antenna nodes that can couple to one or more antennas. Moreover, the electronic device includes a first interface circuit and/or a second interface circuit, wherein the first interface circuit is communicatively coupled to at least a first subset of the one or more antenna nodes and the second interface circuit is communicatively coupled to at least a second subset of the one or more antenna nodes, and wherein the first interface circuit and the second interface circuit, respectively, communicate using different communication protocols in a shared band of frequencies. During operation, the second interface circuit performs a scan of available channels in the shared band of frequencies. Then, the second interface circuit may determine that there are one or more used channels in the shared band of frequencies that are reserved or used with the first communication protocol, which may be associated with the first interface circuit in the electronic device or another electronic device. Alternatively, the second interface circuit may receive, from the first interface circuit, information specifying one or more used channels in the shared band of frequencies that are reserved or used by the first communication protocol. Next, the second interface circuit masks the one or more used channels from the available channels, and the second interface circuit selects one or more channels from remaining available channels for use with the second communication protocol.

Note that the electronic device may include an access point or an eNodeB.

Moreover, the shared band of frequencies may include 2.4 GHz.

Furthermore, the first communication protocol and the second communication protocol may include two of: Bluetooth, Bluetooth low energy, Zigbee, Z-Wave, LoRaWAN, Thread, 6LoWPAN and an IEEE 802.11-compatible communication protocol.

Additionally, the first interface circuit may communicate first packets or frames using the first communication protocol and the one or more used channels, and/or the second interface circuit may communicate second packets or frames using the second communication protocol and the one or more selected channels. The communication by the first interface circuit or the second interface circuit may be concurrent with each other or with another instance, respectively, of the second interface circuit or the first interface circuit.

In some embodiments, one of the first interface circuit and the second interface circuit is coupled to the electronic device using a port in the electronic device, such as a Universal Serial Bus.

A second group of described embodiments provides an electronic device that assigns traffic to different queues. This electronic device includes one or more antenna nodes that can couple to one or more antennas. Moreover, the electronic device includes am interface circuit communicatively coupled to the one or more antenna nodes. During operation, the electronic device receives, at the interface circuit, one or more packets or frames associated with another electronic device. Then, the electronic device determines, based at least in part on information in the one or more packets or frames, a queue priority associated with the other electronic device. When the electronic device receives, at the interface circuit, one or more additional packets or frames associated with the other electronic device, the electronic device provides additional information included in the one or more additional packets or frames to a queue in a set of queues having a latency corresponding to the queue priority.

Note that the electronic device may include an access point or an eNodeB.

Moreover, the set of queues may include a first queue having a first latency and a second queue having a second latency that is smaller than the first latency.

Furthermore, the queue priority may be determined based at least in part on a header in the one or more packets or frames and a stored data structure with characteristics of different electronic devices. For example, the characteristics may include one or more of: an interval between communications with a given electronic device, whether the communications are scheduled, or a type of power source in the given electronic device.

Additionally, the additional information may include a type of data traffic, and the data traffic may be provided to the queue based at least in part on a priority associated with the type of data traffic.

In some embodiments, a first subset of the one or more other electronic devices that have battery power are assigned to the second queue and a remainder of the one or more other electronic devices are assigned to the first queue. However, if the first subset of the one or more electronic devices have a high priority (such as a smoke detector, a carbon-monoxide detector, a burglar alarm, etc.), then the first subset of the one or more electronic devices may be assigned to the first queue and the remainder of the one or more other electronic devices may be assigned to the second queue.

A third group of described embodiments provides a services manager. This services manager includes: a gateway that communicates with one or more electronic devices via a communication protocol (such as Message Queuing Telemetry Transport or MQTT); a control and management plane with system-configuration information; and a data plane with a registry of the one or more other electronic devices, rules for the one or more other electronic devices, and application programming interfaces (APIs) for service providers. The services manager provides a programmable, modular and integrated system for flexibly and securely exchanging data and associated services among the other electronic devices, the services manager and the service providers. Moreover, resources in the services manager associated with different service providers may be contained in separate virtual machines. Alternatively or additionally, the resources from different service providers may be included in 'containers,' such as docker containers). Note that the control and management plane and the data plane may be implemented in separate software stacks in the services manager.

A fourth group of described embodiments provides an electronic device that translates, into a unified format, information associated with one or more other electronic devices, which was received, at an interface circuit in the electronic device, using different communication protocols. Then, the electronic device provides, from the interface circuit, the translated information for one or more additional electronic devices using another communication protocol.

A fifth group of described embodiments provides an electronic device and/or a services manager that facilitates security by selectively including communication with first electronic devices in an inclusion list and/or by selectively excluding communication with second electronic devices in an exclusion list.

A sixth group of described embodiments provides a services manager that dynamically configures subdomains to define a range of communication for one or more other electronic devices using a communication protocol, such as MQTT. Alternatively or additionally, the services manager may dynamically define channels for data traffic with the one or more other electronic devices, where the channels are associated with different topics.

Another embodiment provides a computer-readable storage medium with a program module for use with the electronic device or the services manager. When executed by the electronic device or the services manager, this program module causes the electronic device or the services manager to perform at least some of the aforementioned operations in one or more of the preceding embodiments.

Another embodiment provides a method, which may be performed by the electronic device or the services manager. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
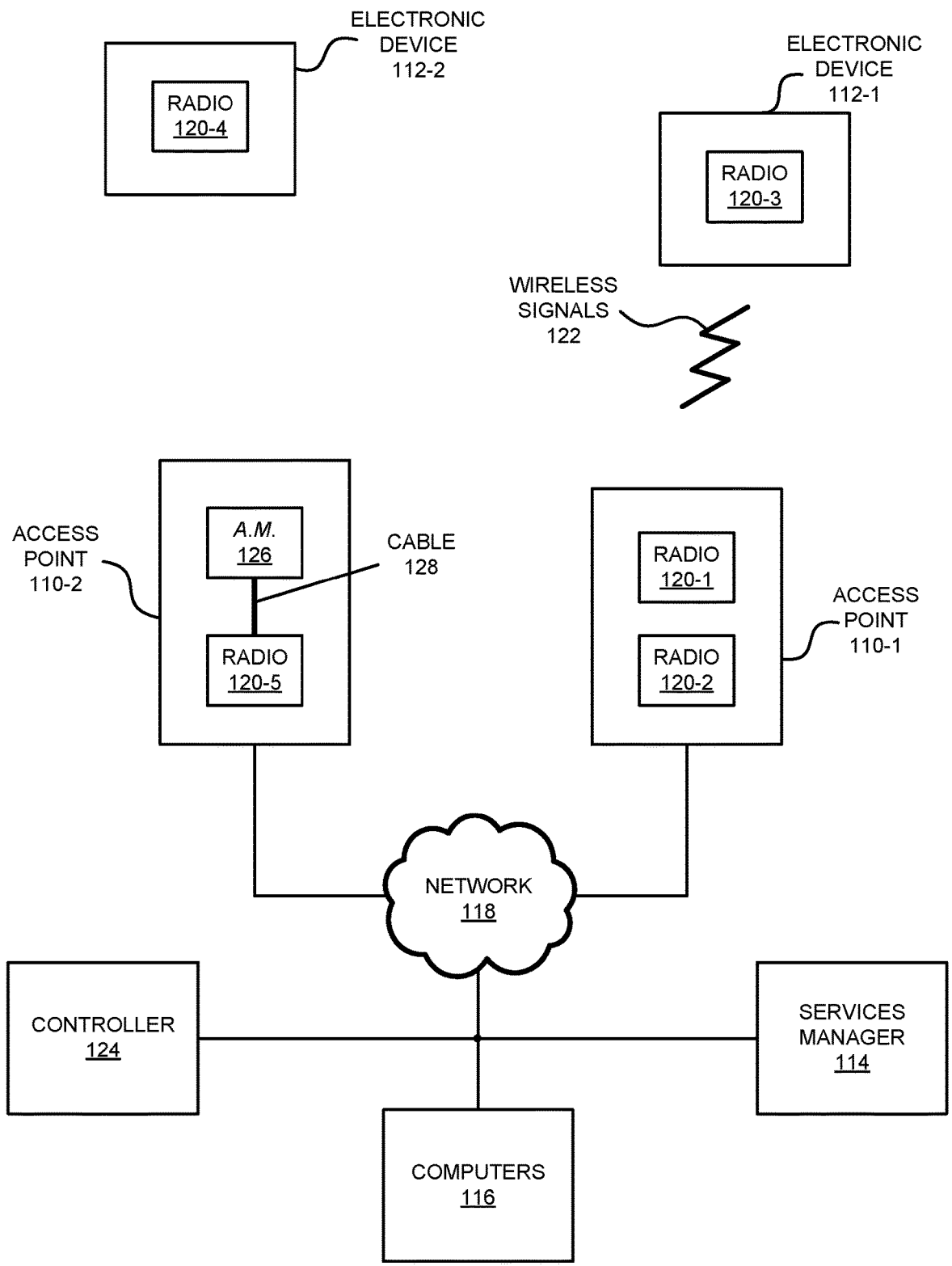
FIG. 1 is a block diagram illustrating communication among electronic devices in accordance with an embodiment of the present disclosure.

In a first group of embodiments, an electronic device (such as an access point or an eNodeB) that provides concurrent or co-existing communication using different communication protocols is described. An interface circuit in the electronic device may communicate using communication protocol in a shared band of frequencies. During operation, the interface circuit may perform a scan of available channels in the shared band of frequencies, and may detect one or more used channels in the shared band of frequencies that are reserved or used by another communication protocol (such as a primary channel that is used by the communication protocol and the other communication protocol). Alternatively, the interface circuit may receive, from another interface circuit in the electronic device, information specifying the one or more used channels in the shared band of frequencies that are reserved or used by the other communication protocol. Next, the interface circuit may mask the one or more used channels from the available channels, and the interface circuit may select one or more channels from the remaining available channels for use with the communication protocol.

By selecting one or more channels that are different from the one or more used channels, this communication technique may facilitate concurrent communication between the electronic device and one or more other electronic devices using the communication protocol and the other communication protocol. Consequently, the communication technique may improve the communication performance (such as reduced latency and interference) of the electronic device, which may improve the user experience when communicating using the electronic device and, more generally, may enable the IoT.

In a second group of embodiments, an electronic device (such as an access point or an eNodeB) that assigns traffic to different queues is described. This electronic device may receive one or more packets or frames from another electronic device. Then, the electronic device may determine, based at least in part on information in the one or more packets or frames, a queue priority associated with the other electronic device. For example, the queue priority may be determined based at least in part on a header in the one or more packets or frames and a stored data structure with characteristics of different electronic devices. Next, when the electronic device receives one or more additional packets or frames from the other electronic device, the electronic device may provide additional information included in the one or more additional packets or frames to a queue in a set of queues in the electronic device that have a latency corresponding to the queue priority.

By assigning the traffic to the appropriate queue, this communication technique may ensure that the queue properties (such as latency) match those of the other electronic device. For example, intermittent traffic from another electronic device that includes a battery and that has low priority may be assigned to a lower latency queue, while traffic from one or more other electronic devices may be assigned to a higher latency queue. Consequently, the communication technique may ensure that system resources are appropriately allocated without adversely affecting communication performance. Therefore, the communication technique may reduce cost and complexity of the electronic device, while maintaining the user experience when communicating using the electronic device and, more generally, may enable the IoT.

In a third group of embodiments, a services manager is described. This services manager may provide a programmable, modular and integrated system for flexibly and securely exchanging data and associated services among one or more other electronic devices, the services manager and service providers. Moreover, services manager may include: a gateway that communicates with one or more electronic devices via a communication protocol (such as Message Queuing Telemetry Transport or MQTT); a control and management plane with system-configuration information; and a data plane with a registry of the one or more other electronic devices, rules for the one or more other electronic devices, and application programming interfaces (APIs) for the service providers. Note that resources in the services manager associated with different service providers may be contained in separate virtual machines, and/or that the control and management plane and the data plane may be implemented in separate software stacks in the services manager.

By providing flexible and secure exchange of data and the associated services, the services manager may address current obstacles to the IoT. In particular, the services manager may remove siloes between components from different manufacturers and providers (such as local electronic devices that provide sensors and actuators and service providers), and may facilitate dynamic services for customers (such as services that are configured and provided as needed). Moreover, the services manager facilitates interoperability of disparate components from different manufacturers and providers without requiring a standard or retrofitting of legacy equipment. Furthermore, the services manager may eliminate the need for additional (and expensive) dedicated equipment (such as separate gateways for electronic devices from different manufacturers and/or additional network switches to connect to different cloud-based service providers). Thus, the services manager may enable integrated solutions and the IoT, which may allow a wide variety of valued-added applications and services, enhanced economic activity and enhanced user experiences and customer satisfaction.

In the discussion that follows, electronic devices (such as an access point or an eNodeB) communicate frames or packets in accordance with one or more wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), Bluetooth low energy or BLE (from the Bluetooth Special Interest Group of Kirkland, Wash.), Zigbee (from the Zigbee Alliance of Davis, Calif.), Z-Wave (from Sigma Designs, Inc. of Fremont, Calif.), LoRaWAN (from the Lora Alliance of Beaverton, Oreg.), Thread (from the Thread Group of San Ramon, Calif.), IPv6 over low-power wireless personal area networks or 6LoW-PAN (from the Internet Engineering Taskforce of Fremont, Calif.) and/or another type of wireless interface. In the discussion that follows, Wi-Fi and Bluetooth are used as illustrative examples. However, a wide variety of communication protocols (such as Long Term Evolution or LTE, another cellular-telephone communication protocol, etc.) may be used.

Moreover, the access point may communicate with other access points and/or computers in a network using a wired communication protocol, such as an IEEE 802.3 standard (which is sometimes referred to as 'Ethernet'), MQTT and/or another type of wired interface. In the discussion that follows, MQTT and Ethernet are used as illustrative examples.

FIG. 1 presents a block diagram illustrating an example of communication among one or more access points 110, one or more electronic devices 112 (such as a cellular telephone), a services manager 114, and one or more computers 116 associated with service providers in accordance with some embodiments. In particular, access points 110 may communicate with each other and other components in FIG. 1 using wireless and/or wired communication. Note that access points 110 may include a physical access point and/or a virtual access point that is implemented in software in an environment of an electronic device or a computer. Furthermore, at least some of access points 110 may communicate with electronic devices 112 using wireless communication.

The wired communication among access points 110 and other components (such as services manager 114) may occur via network 118 (such as an intra-net, a mesh network, point-to-point connections and/or the Internet) and may use a network communication protocol, such as Ethernet or MQTT. Moreover, the wireless communication using Wi-Fi or another wireless communication protocol (such as Bluetooth) may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, wireless communication by access points 110 also involves the use of dedicated connections, such as via a peer-to-peer (P2P) communication technique.

Figure 11:
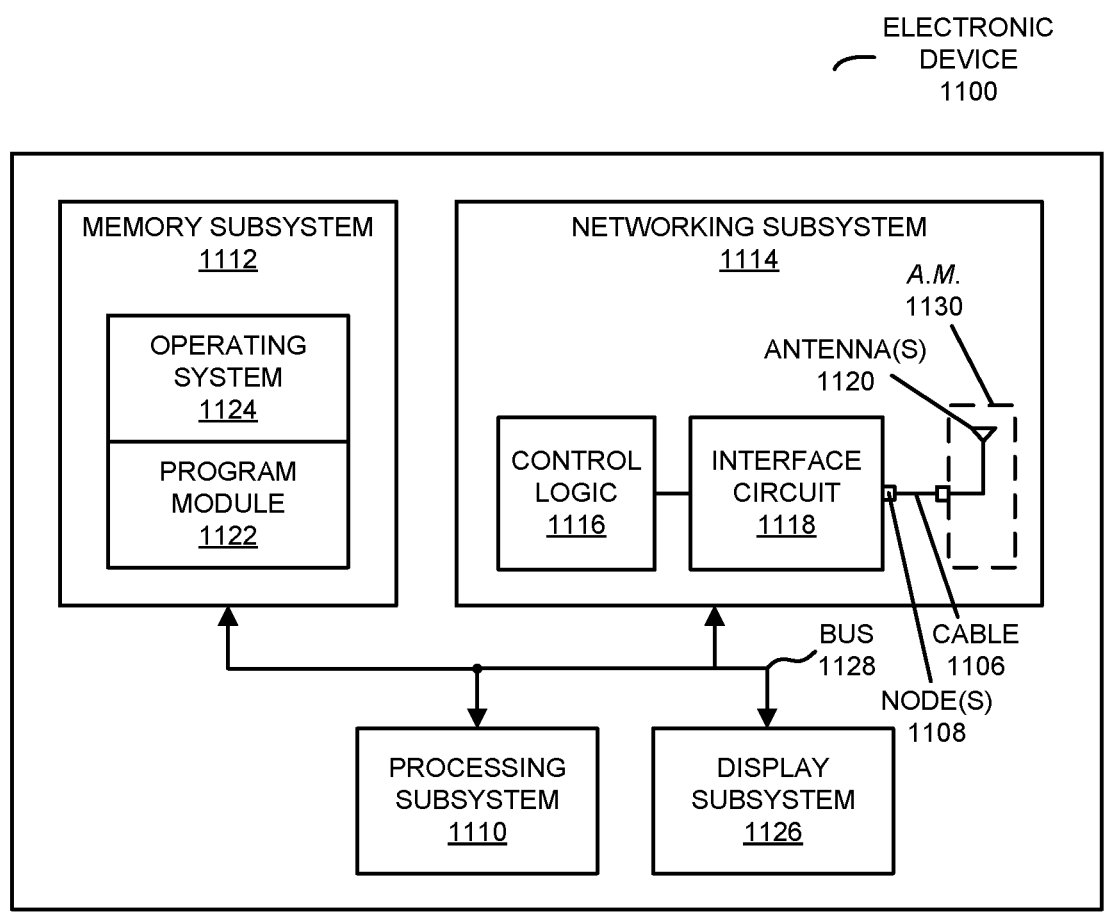
FIG. 11 is a block diagram illustrating an electronic device in accordance with an embodiment of the present disclosure.

As described further below with reference to FIG. 11, access points 110, electronic devices 112, services manager 114 and/or computers 116 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120. In some embodiments, such as in access point 110-2, radio 120-5 is coupled to a separate antenna module (A.M.) 126 by a cable 128.

As can be seen in FIG. 1, wireless signals 122 (represented by a jagged line) are transmitted from radios 120-1 and/or 120-2 in access point 110-1. These wireless signals may be received by radio 120-3 in electronic device 112-1. In particular, access point 110-1 may transmit frames or packets. In turn, these frames or packets may be received by electronic device 112-1. Moreover, access point 110-1 may allow electronic device 112-1 to communicate with other electronic devices, computers and/or servers via network 118.

Note that the communication between at least pairs of components in FIG. 1 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving wireless signals 122 with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously and as described further below with reference to FIG. 2, one of access points 110 (such as access point 110-1) may perform at least some aspects of the communication technique. This may allow access points 110 to become one-touch points of access to the IoT using a single framework. In particular, access points 110 may facilitate the dynamic integration of multiple electronic devices and service providers in a variety of applications, as well as easy deployment and upgrades.

Figure 7:
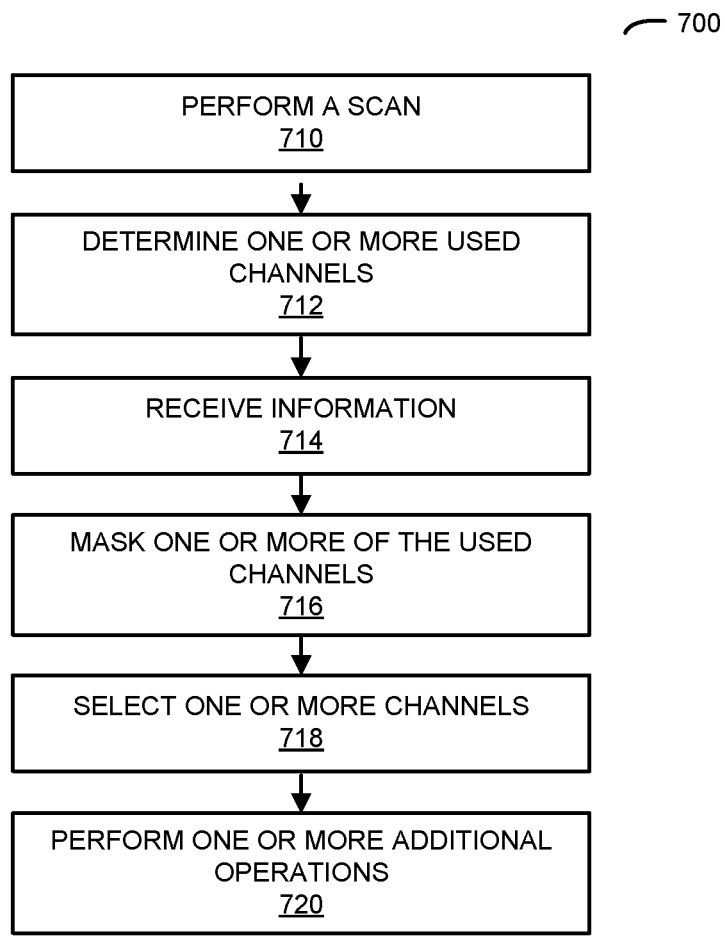
FIG. 7 is a flow diagram illustrating a method for providing concurrent communication using different communication protocols in one of the electronic devices in FIG. 1 in accordance with an embodiment of the present disclosure.

In particular, as described further below with reference to FIGS. 7 and 8, access point 110-1 may provide co-existing or concurrent communication using different communication protocols. In particular, access point 110-1 may include radio 120-1 and/or 120-2. These radios may, respectively, communicate using different communication protocols in a shared band of frequencies (such as the 2.4 GHz ISM band of frequencies). For example, radio 120-1 may be a Bluetooth radio and radio 120-2 may be a Wi-Fi radio (or vice versa). During operation, radio 120-2 may perform a scan of available channels in the shared band of frequencies. Radio 120-2 may detect or determine that Bluetooth and Wi-Fi may each use one of primary channels 1, 6 and 11 (such as channel 1). Alternatively, radio 120-2 may receive, from radio 120-1 (if access point 110-1 includes radio 120-1), information specifying one or more used channels in the shared band of frequencies that are reserved or used by the Bluetooth communication protocol. Next, radio 120-2 may mask the one or more used channels from the available channels (such as by masking out 8-16 MHz corresponding to primary channel 1), and radio 120-2 may select one or more channels from remaining available channels for use with the Wi-Fi communication protocol, such as a new primary channel. Thus, because Wi-Fi has the ability to hop among different channels while Bluetooth and Zigbee typically do not hop, channel masking may be used to facilitate co-existing and/or concurrent communication among access points 110 and electronic devices 112 using two different communication protocols in the shared band of frequencies.

While access point 110-1 is illustrated with separate radios 120-1 and 120-2, in some embodiments these radios are combined into a single radio or integrated circuit. Alternatively or additionally, packet-traffic arbitration between radios 120-1 and 120-2 may be used. In particular, when one of the radios is transmitting or receiving using a channel and a first communication protocol, it may communicate a hold (such as a hold signal or instruction) to the other radio, so that the other radio temporarily does not communicate using the channel and a second communication protocol.

In some embodiments, additional communication capability is added to access point 110-1 via a plug-in module, such as a dongle (which is sometimes referred to as a 'USB dongle') that is inserted into a USB port in access point 110-1. For example, radio 120-1 may be a USB dongle that adds Bluetooth communication capability to access point 110-1. In conjunction with software on access point 110-1, this may enable communication-protocol recognition and translation, as well as communication via another communication protocol (as was just described).

Moreover, as described further below with reference to FIGS. 9 and 10, access point 110-1 may assigns traffic associated with one or more of electronic devices 112 to different queues. During operation, access point 110-1 may receive, at radio 120-1 or 120-2, one or more packets or frames associated with another electronic device, e.g., that were sent by electronic device 112-1. Then, access point 110-1 may determine, based at least in part on information in the one or more packets or frames, a queue priority associated with electronic device 112-1. For example, access point 110-1 may use a header in the one or more packets or frames to identify electronic device 112-1, such as a media access control (MAC) address. Moreover, access point 110-1 may access a stored data structure with characteristics of different electronic devices, and using the MAC address may determine that electronic device 112-1 is battery powered with low priority and/or has a low frequency of or long-time intervals between communications with access point 110-1. Consequently, access point 110-1 may assign traffic associated with electronic device 112-1 to a lower latency queue. On the other hand, if access point 110-1 determined that electronic device 112-1 is not battery powered, has a high priority (such as a smoke or carbon-monoxide detector, a burglar alarm, etc.) and/or that it has a high frequency of or short-time intervals between communications with access point 110-1, access point 110-1 may assign traffic associated with electronic device 112-1 to a higher latency queue. Next, when access point 110-1 receives, at radio 120-1 or 120-2, one or more additional packets or frames associated with electronic device 112-1, access point 110-1 may provide additional information included in the one or more additional packets or frames to a queue in a set of queues having a latency corresponding to the determined queue priority.

Thus, access point 110-1 may use electronic-device fingerprinting based on information in one or more headers and/or a data structure with characteristics of electronic devices to determine the queue priority. This capability may allow access point 110-1 to respond in an appropriate manner, such as a rapid or fast response to intermittent data from a high-priority electronic device, such as a smoke detector or a fire alarm.

Furthermore, as described further below with reference to FIGS. 3 and 4, additional infrastructure may perform at least some aspects of the communication technique. In particular, services manager 114 may enable dynamic integrated solutions with disparate (and otherwise potentially incompatible) components, such as one or more sensors and/or actuators from different manufacturers, and/or one or more service providers. These different components may be associated with different (unrelated) entities, such as different companies or organizations.

In particular, services manager 114 may include: a gateway that communicates with one or more of access point 110 via a communication protocol (such as MQTT); a control and management plane with system-configuration information; and a data plane with a registry of the one or more electronic devices 112, rules for the one or more electronic devices 112, and application programming interfaces (APIs) for service providers. Services manager 114 may provide a programmable, modular and integrated system for flexibly and securely exchanging data and associated services among access points 110, electronic devices 112, services manager 114 and computers 116. Note that resources in services manager 114 that are associated with different service providers may be contained in separate virtual machines. Alternatively or additionally, the resources from different service providers may be included in 'containers,' such as docker containers). Furthermore, the control and management plane and the data plane may be implemented in separate software stacks in services manager 114.

In some embodiments, optional controller 124 is used to configure settings of access points 110, such as transmit power, a transmit antenna pattern, a receive antenna pattern, etc. Thus, controller 124 may provide Wi-Fi control and management planes. Moreover, controller 124 may initialize IoT services that are facilitated and managed by services manager 114, i.e., services manager 114 may provide IoT data plane and control and management plane. In addition, services manager 114 may provide a partner portal for Wi-Fi and IoT management by one or more of computers 116. Note that in some embodiments, controller 124 may be combined with services manager 114 in a single device. Furthermore, note that controller 124 and/or services manager 114 may be local devices where access points 110 and electronic devices 112 are installed and used, or may be at a remote location (such as a cloud-based implementation).

In these ways, the communication technique may enable the IoT. In particular, access points 110 and services manager 114 may provide a single-access network for Wi-Fi and IoT traffic. Access points 110 and services manager 114 may: manage network across different physical layers, provide sensor-to-backend management, and/or distributed decision-making (such as at the edge immediately behind a firewall versus backend processing). Moreover, access points 110 and services manager 114 may be: transport protocol agnostic, architecture agnostic to the transport layer, and/or may support a variety of communication or transport protocols, such as Zigbee, BLE and/or other IoT communication protocols. Furthermore, access points 110 and services manager 114 may: provide a network backbone for a variety of services, enable end-to-end services for multiple connected ecosystems, and/or provide end-to-end solutions with a simplified value chain and a single network.

In these ways, the communication technique may allow access points 110 and/or services manager 114 to provide flexible and secure exchange of data and the associated services. Moreover, the communication technique may remove siloes between components from different manufacturers and providers (such as local electronic devices that provide sensors and actuators and service providers), and may facilitate dynamic services for customers (such as services that are configured and provided as needed). Furthermore, services manager 114 may facilitate interoperability of disparate components from different manufacturers and providers without requiring a standard or retrofitting of legacy equipment. Additionally, services manager 114 may eliminate the need for additional (and expensive) dedicated equipment (such as separate gateways for electronic devices from different manufacturers and/or additional network switches to connect to different cloud-based service providers). Thus, services manager 114 may enable integrated solutions and the IoT, which may allow a wide variety of valued-added applications and services, enhanced economic activity and enhanced user experiences and customer satisfaction.

While the communication technique in FIG. 1 is illustrated using access points 110 and services manager 114, in other embodiments at least some of the access points 110 may be eNodeBs (not shown). Moreover, an eNodeB may communicate with at least one of access points 110, e.g., using an LTE-WLAN aggregation (LWA) communication protocol.

We now further describe embodiments of access points 110 and services manager 114. Current sensor gateways often operate within closed proprietary ecosystems, which can make it difficult to integrate a wide array of management platforms and disparate sensor networks. These problems are typically compounded by architectural limitations. For example, the gateways may have monolithic non-modular architectures that often are not scalable and customizable for different sensor network deployment scenarios, and these gateways are usually tied to expensive purpose-built hardware.

In order to address these challenges, access points 110 may aggregate and disburse data across disparate sensors, and may include data-acquisition and data transformation capabilities (such as a data acquisition and transformation engine or control logic). In addition, services manager 114 may include: a gateway abstraction service, an internal software development kit (SDK) that allows management of a control and management plane, and/or a partner services SDK that allows partner services providers to manage contained resources in services manager 114 that are associated with the partner services providers. Note that communication between services manager 114 and access points 110 may use a communication protocol, such as MQTT.

Figure 2:
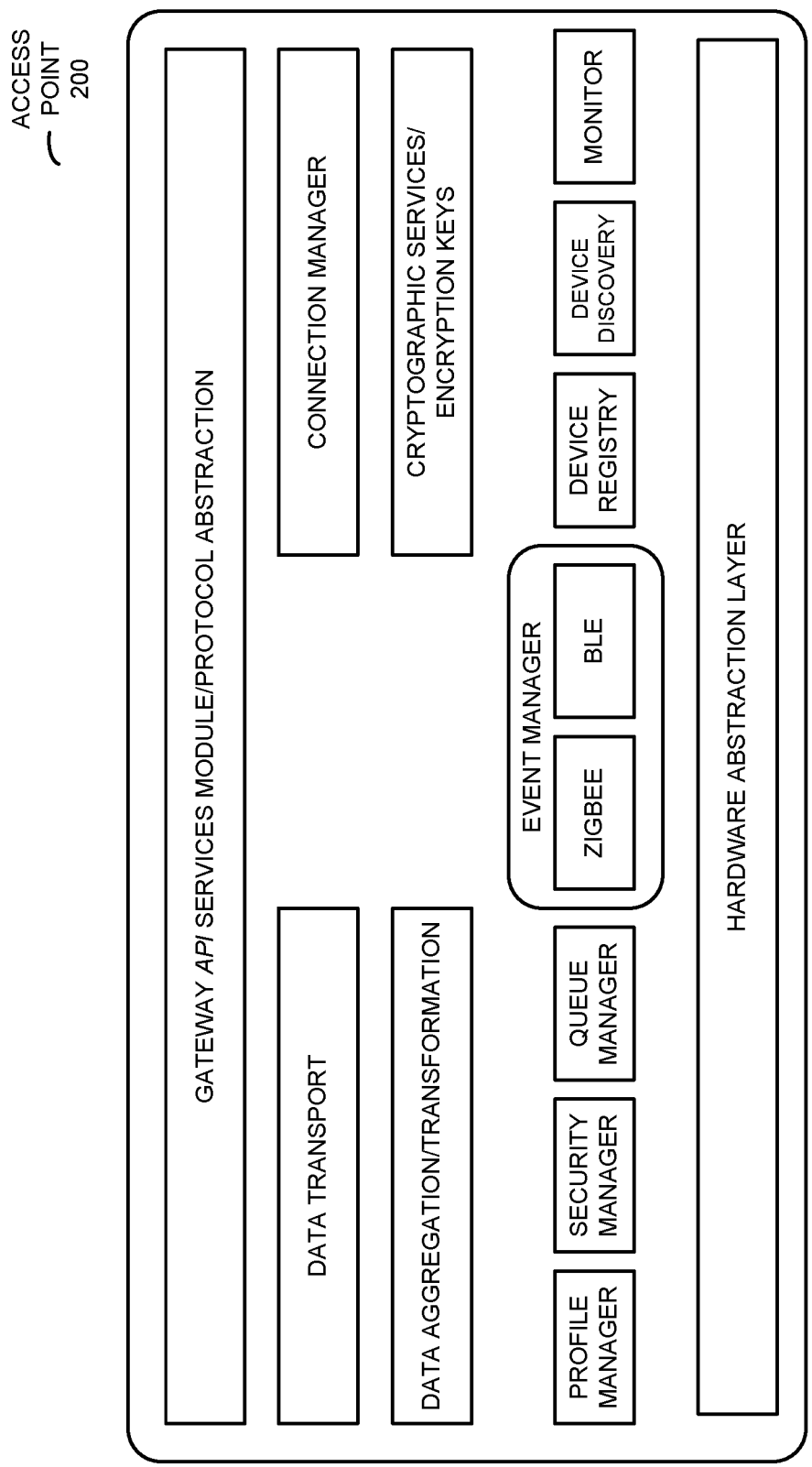
FIG. 2 is a drawing illustrating functionality of an access point in FIG. 1 in accordance with an embodiment of the present disclosure.

FIG. 2 presents a drawing illustrating an example of functionality of an access point 200, such as access point 110-1 in FIG. 1. Access point 200 may include an embedded IoT gateway and may provide a sensor management platform that is programmable and that can be easily integrated with existing management solutions. The core gateway functions in access point 200 may include: different communication-protocol stacks, a hardware for communication-protocol abstraction (which can provide a unified view of sensors to management platform), data acquisition (such as data aggregation and transformation), prioritization (data/traffic prioritization), management (which can access and set an electronic-device configuration), security (secure electronic-device authentication/actuation and cryptographic services, such as storing one or more encryption keys associated with particular electronic devices), data transport (such as MQTT), a connection manager and/or a gateway API services module and communication-protocol abstraction. In addition, access point 200 may include: an event manager core application (for different communication protocols, such as Zigbee or BLE), a profile manager for the different communication protocols, a security manager, a queue manager, an electronic-device registry, electronic-device discovery and/or a monitor that ensures safe and appropriate operation (such as by detecting an anomaly), and that tracks communication performance, etc.

In some embodiments, access point 200 may include a trusted secure element, WLAN firmware, an IoT gateway engine or control logic (such as one or more physical layer communication protocols) and an application layer that translates between different communication protocols. Note that a given access point may provide at least one communication protocol (in addition to Wi-Fi) via a USB dongle, and groups of access points may be interleaved to provide multiple different communication protocols.

After receiving information (such as sensor data) from one or more of electronic devices 112 in FIG. 1, access point 200 may translate, into a unified format, the information associated with the one or more electronic devices 112, which may have been received by access point 200, at an interface circuit in access point 200, using different communication protocols. Then, access point 200 may send or communicate the translated information in a unified and consistent manner to a services manager, such as services manager 114 (FIG. 1). For example, access point 200 may provide, from an interface circuit in access point 200, the translated information for one or more additional electronic devices (such as services manager 114 in FIG. 1) using another communication protocol, such as MATT.

In some embodiments, access point 200 (or services manager 114 in FIG. 1) may provide security by selectively including communication with an electronic device (such as electronic device 112-1 in FIG. 1) in an inclusion list and/or by selectively excluding communication with another electronic devices (such as electronic device 112-2 in FIG. 1) in an exclusion list. For example, the black and/or white lists may be applied by access point 200 following a scan.

Figure 3:
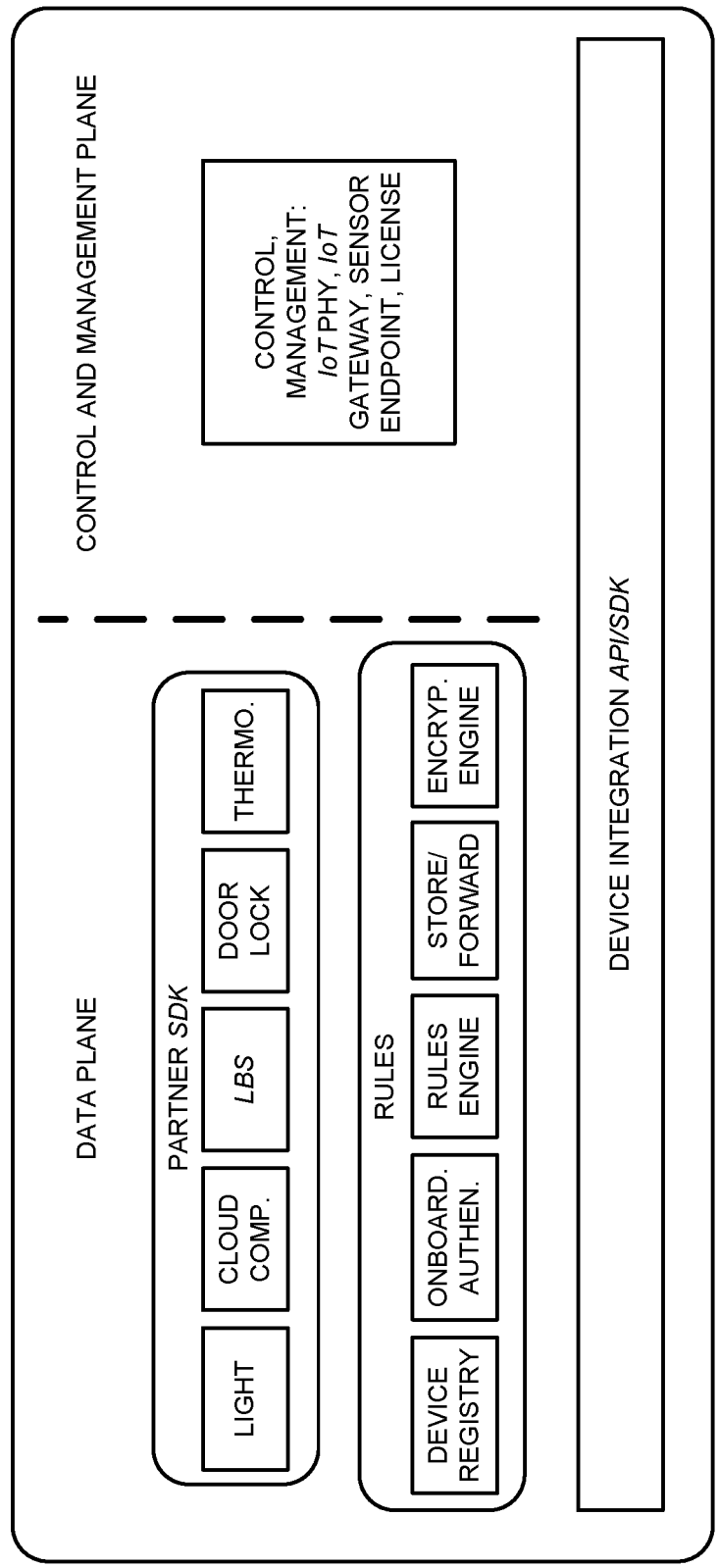
FIG. 3 is a block diagram illustrating an Internet-of-Things (IoT) services manager of FIG. 1 in accordance with an embodiment of the present disclosure.
Figure 4:
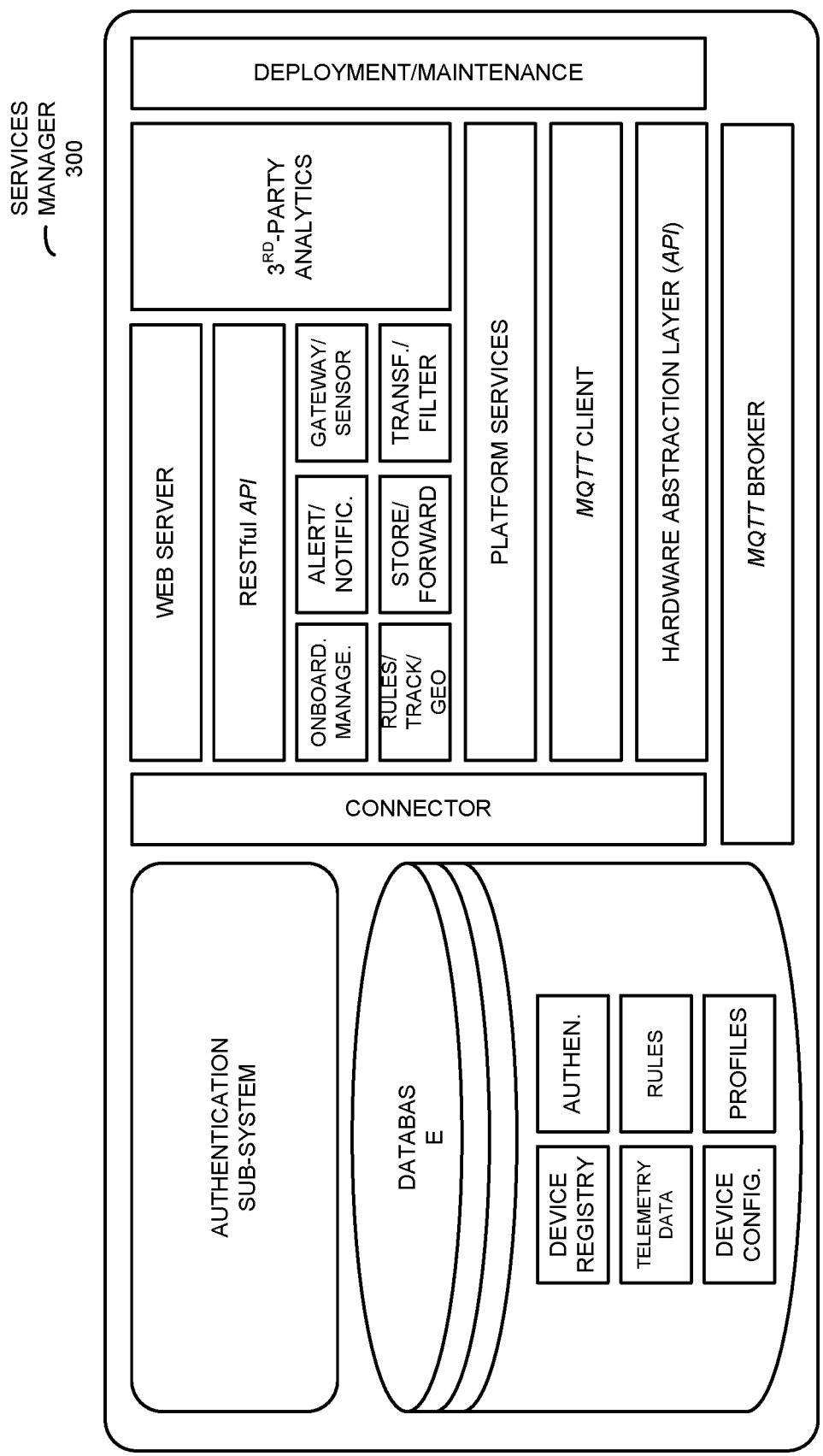
FIG. 4 is a block diagram illustrating a software architecture of the services manager of FIGS. 1 and 3 in accordance with an embodiment of the present disclosure.

FIG. 3 presents a block diagram illustrating an example of a Virtual Internet-of-Things (VIoT) services manager 300, such as services manager 114 in FIG. 1. This services manager may include: a gateway that communicates with one or more access points 110 (FIG. 1) via a communication protocol (such as MQTT); a control and management plane with system-configuration information; and a data plane with a registry of the one or more of electronic devices 112 (FIG. 1), rules for the one or more of electronic devices 112, and APIs for service providers. Services manager 300 may provide a programmable, modular and integrated system for flexibly and securely exchanging data and associated services among access points 110, electronic devices 112, services manager 114 or 300, and computers 116 in FIG. 1. Moreover, resources in services manager 300 that are associated with different service providers may be contained in separate virtual machines. Alternatively or additionally, the resources from different service providers may be included in 'containers,' such as docker containers). Note that a docker container may be a lightweight, stand-alone, executable package of a piece of software that includes everything needed to run it: code, runtime, system tools, system libraries, and settings. The containerized software may run the same, regardless of the environment. Containers also may isolate software from its surroundings, such as differences between development and staging environments, and may help reduce conflicts between different software that is running on the same infrastructure.

As noted previously, services manager 300 may include a control and management plane. The control and management plane may include: control management, an IoT physical layer, a gateway (such as a gateway engine, control logic or module), a sensor endpoint, and/or associated licenses. In addition, the control and management plane may provide system-architecture configuration, such as: transmit power, Internet Protocol or IP addresses, etc.

Moreover, services manager 300 may include a data plane with a partner SDK (for applications/services such as: a door lock, a thermostat, a light, analytical services, location-based services or LBS, cloud-based computing, etc.). Furthermore, the data plane may include rules, such as: an electronic-device registry, a rules engine or module, onboarding, authentication, an encryption engine or control logic, and store and forward.

Services manager 300 may be a dual-stack, open-programmable, virtualized sensor-management gateway platform. It may be highly customizable, deployable in multiple network topologies, and may be integrated with existing management networks. The dual-stack, open-programmable, virtualized sensor-management gateway platform may be an enterprise-grade sensor-management platform. Note that services manager 300 may be a policy-driven virtualized wireless gateway that manages a sensor network that includes one or more types of sensors from one or more manufacturers, and which may use different communication protocols. The open framework may facilitate sensor management in separate virtual machines, which may offer different vertical services.

In some embodiments, access point 200 (FIG. 2) and/or services manager 300 addresses a typical sensor-network management system, which may include: wireless sensor devices, a physical communication layer, a network connectivity/protocol layer, and/or a gateway layer. In particular, access point 200 (FIG. 2) may include a data acquisition layer. For example, a data acquisition engine or control logic may enable gateway communication at scale with many sensors using disparate sensor connectivity or communication protocols (such as BLE, Zigbee, Z-Wave, etc.). This data acquisition layer may include the drivers and metadata information used to recognize and communicate with the different sensor types using different communication protocols.

Moreover, access point 200 (FIG. 2) may include an aggregation and translation layer. In particular, many of the sensor connectivity or communication protocols are rudimentary and fragmented. For example, Zigbee or BLE often does not provide support for IP. The aggregation and translation layer may perform the function of normalizing the data collected across these sensors. This block may perform packet processing and encapsulation functions for disparate incoming sensor packets and the output of this block may be normalized data in a standard format (such as MQTT) that is recognizable by a programmable application layer.

Furthermore, services manager 300 may include a programmable application layer. In particular, a smart-gateway abstraction service in services manager 300 may provide a full edge analysis engine or module. For example, the programmable application layer may implement blocks and functions, such as: a message broker, a rules engine or module, an onboarding engine or module, an electronic-device registry, a store and forward engine or module, and/or an encryption engine of control logic. Note that this layer may host a runtime environment and/or libraries that enable a third-party IoT SDKs, such as the partner service-provider SDKs. The routing of data packets to different third-parties may be based on predefined policies specified by a user, such as a customer or a service-provider partner.

Additionally, services manager 300 may include an open management interface layer.

Services manager 300 may be a self-contained virtual machine that includes APIs that enable customers and/or service-provider partners to add another layer of contextualization/customization based at least in part on specific business needs. This flexibility may make services manager 300 highly programmable and rapidly deployable.

Note that services manager 300 may be architected as a dual-stack gateway. A first stack may include the data acquisition layer and the aggregation and translation layer. As discussed previously, the first stack may physically reside in a wireless access point (such as access point 200 in FIG. 2) and/or in on-premise gateway hardware.

A second stack may include the programmable application layer and the open management interface layer. Note that the second stack is a virtual machine that can reside on any of the wireless gateway hardware, such as access point 200 (FIG. 2), controller 124 (FIG. 1), services manager 300. Thus, the second stack may be on-premise, in a data center or may be cloud-based. Therefore, in general functionality of access point 200 (FIG. 2) and/or services manager 300 may be implemented by an arbitrary component, such as a local or a distributed electronic device or system.

The dual-stack architecture may provide flexibility to be deployed in an arbitrary network topology. In addition, this architecture may enable a distributed gateway architecture.

The core functions of the solution (which is sometimes referred to as an 'IoT gateway') implemented in access point 200 (FIG. 2) and services manager 300 may include: centralized management (secure onboarding management of sensors and gateways), data aggregation (aggregate and transform data from multiple gateways), edge analytics (process data at the edge, i.e., behind the firewall, from multiple gateways), hardware abstraction (provide unified view/management of different sensor types), and/or rules and alerts (create rules and alerts, predictive analysis, etc.).

The technology and capabilities of the solution implemented in access point 200 (FIG. 2) and services manager 300 may include: self-contained container/virtual machine that can be hosted anywhere (such as a controller, a switch, in the cloud, etc.). Moreover, the solution may have multi-tenants, which provides flexible deployment models and allows the use of a public and/or a private cloud. Furthermore, the solution may have the ability to host $3^{rd}$-party SDKs and may provide a unified view of sensors/gateways. Additionally, the solution may incorporate edge computing capabilities (e.g., via a partner SDK and/or internal capability). The solution may be highly modular with a cloud-scale architecture.

In some embodiments, an open, programmable IoT gateway module may be programmed through a multitude of management platforms using one or more interfaces. Moreover, the IoT gateway may be capable of machine learning and intelligent decision making at the edge without backhauling information to the cloud, e.g., intelligent channel selection and assignment of channels across disparate wireless radios (such as Zigbee, Bluetooth, Wi-Fi, LoRaWAN, etc.). Furthermore, the IoT gateway may automatic detect anomalies and may dynamically use rules for creation/insertion to suppress anomalies. In addition the IoT gateway may provide notifications, intelligent tracking and geo fencing of IoT and sensor assets. Additionally, the IoT gateway may intelligently identity and classify electronic devices, e.g., learning electronic-device characteristics based on communication patterns, association patterns, and/or beaconing patterns. These characteristics may be used to assign traffic from an electronic device to a queue with an appropriate queue latency. The IoT gateway may also prioritize electronic devices and/or electronic-device categories based on the learned characteristics, which may be used to prioritization of messages and/or message categories. In some embodiments, the IoT gateway may guarantee delivery of certain IoT messages, such as based at least in part on prioritization, intelligent classification and/or machine learning FIG. 4 presents a block diagram illustrating an example of a software architecture of services manager 300. In particular, services manager 300 may include: an MQTT broker, a hardware abstraction layer API, an MQTT client, VIoT platform services (such as Java/Python runtime platform services), a gateway/sensor onboarding management, alerts/notifications, gateway/sensor actions, a rules engine/tracking/geo fencing, store and forward, and/or data transformation and filter. In addition, services manager 300 may include: $3^{rd}$-party edge analytics, a RESTful API (which uses HTTP requests to GET, PUT, POST and DELETE data) for provisioning, actuation, statistics aggregation and management, a web server, an authentication sub-system, and/or a database. The $3^{rd}$-party edge analytics may interface to external analytics services, the web server may interface to one or more external cloud-based components, partner management portals, dashboard services and/or mobile applications. Note that the database may include information, such as: an electronic-device registry, telemetry data, electronic-device configuration, authentication, rules and/or profiles (e.g., electronic-device characteristics). In some embodiments, services manager 300 supports blockchain for highly secure environments.

Figure 5:
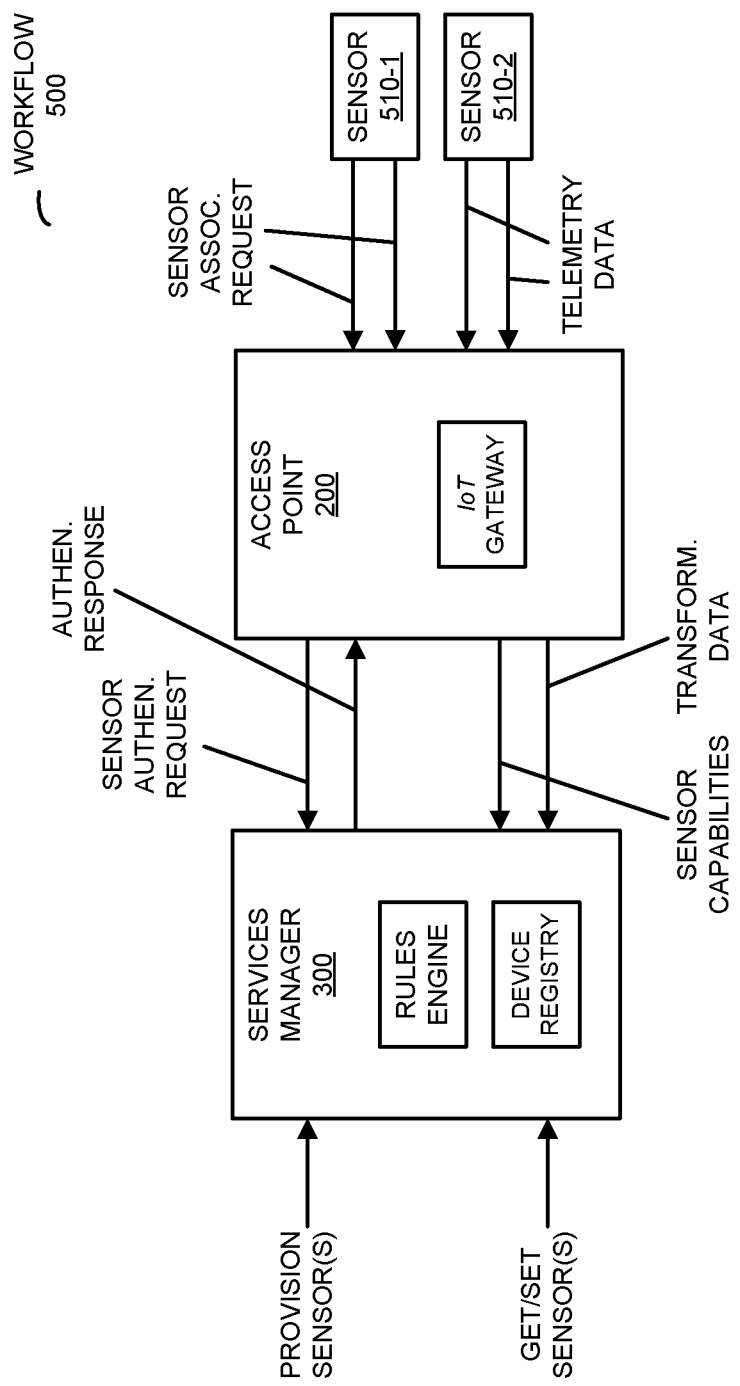
FIG. 5 is a drawing illustrating an onboarding work flow in accordance with an embodiment of the present disclosure.

FIG. 5 presents a drawing illustrating an example of an onboarding work flow 500. In particular, sensors may be provisioned via an API call. Then, services manager 300 may create entry in an electronic-device registry. Moreover, one or more of sensor 510 may provide a sensor associate request to a gateway in access point 200. In response, access point 200 may provide a sensor authorization request to services manager 300, and may receive an authorization response. Next, access point 200 may provide information about sensor capabilities (and, more generally, characteristics of sensors 510). Furthermore, services manager 300 may receive an API call to get or set sensors, which may be forwarded to one or more of sensors 510. In response, one or more of sensors 510 (such as sensor 510-2) may provide telemetry data. Associated transformed data may be provided by access point 200 to services manager 300. Additionally, services manager 300 may process the transformed data and/or may trigger local rules.

Figure 6:
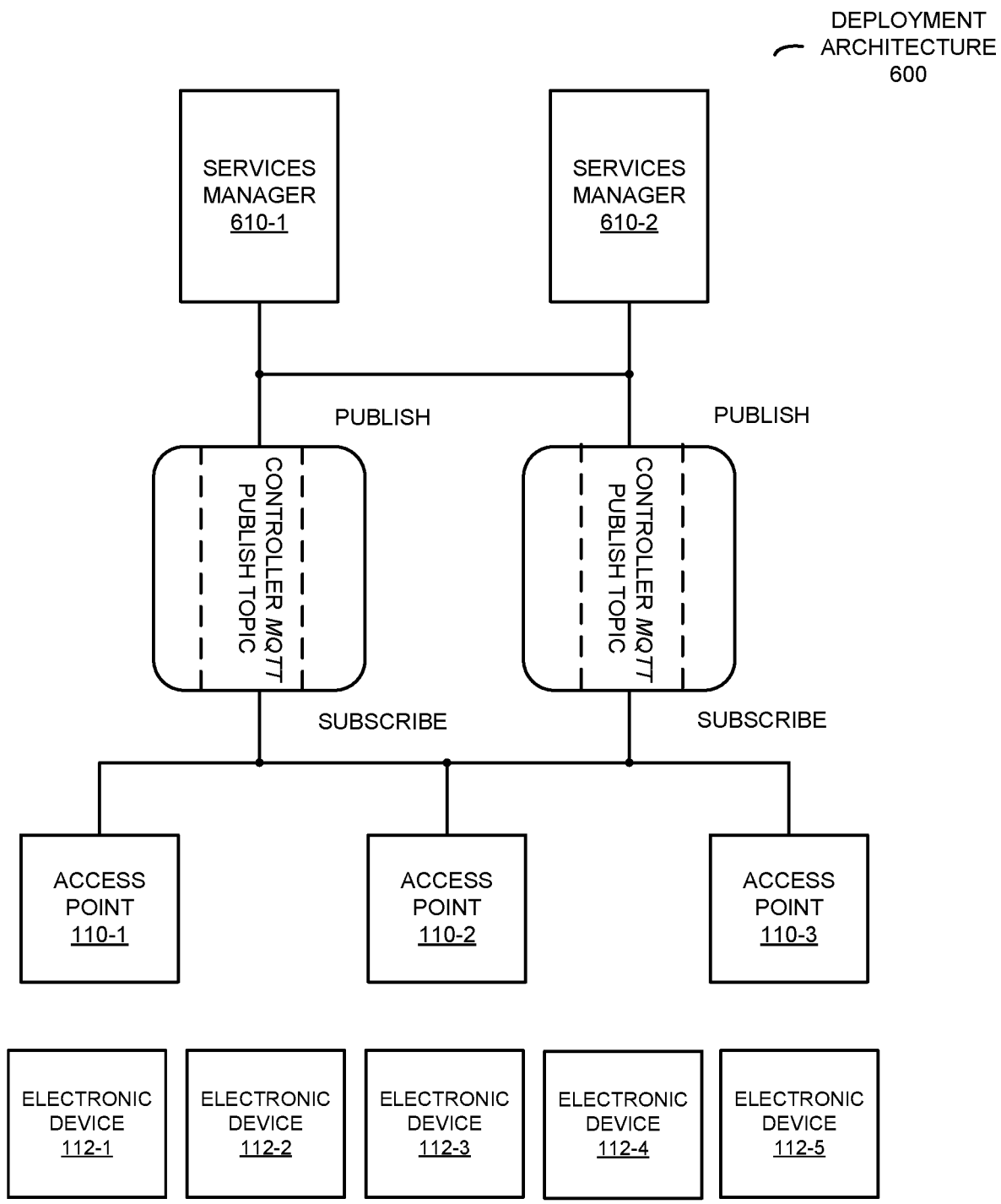
FIG. 6 is a drawing illustrating a deployment architecture in accordance with an embodiment of the present disclosure.

FIG. 6 presents a drawing illustrating an example of a deployment architecture 600. This architecture may include: one or more electronic devices 112 (which may include one or more sensors), one or more access points 110 (or gateways), and one or more services managers 610. Services managers 610 may publish or subscribe messages via controller MQTT publish topics. For example, services managers 610 may publish or subscribe messages using channels (which may be static or dynamic) having associated priorities.

Note that a given services manager (such as services manager 610-1) may dynamically configure subdomains in access points 110 and/or electronic devices 112 (FIG. 1) to define a range of communication using a communication protocol, such as MQTT. Alternatively or additionally, the given services manager may dynamically define channels for data traffic with access points 110 and/or electronic devices 112, where the channels are associated with different topics.

We now describe embodiments of methods associated with the communication technique. FIG. 7 presents a flow diagram illustrating an example of a method 700 for providing concurrent communication using different communication protocols, which may be performed by an electronic device, such as access point 110-1 in FIG. 1. During operation, a second interface circuit in the electronic device may perform a scan (operation 710) of available channels in a shared band of frequencies using a second communication protocol. Then, the second interface circuit may determine that there are one or more used channels (operation 712) in the shared band of frequencies that are reserved or used with a first communication protocol, which may be associated with a first interface circuit in the electronic device or another electronic device. Alternatively, the second interface circuit may receive, from a first interface circuit, information (operation 714) specifying the one or more used channels in the shared band of frequencies that are reserved or used by the first communication protocol.

Next, the second interface circuit may mask the one or more used channels (operation 716) from the available channels, and the second interface circuit may select one or more channels (operation 718) from remaining available channels for use with the second communication protocol.

Note that the electronic device may include an access point or an eNodeB.

Moreover, the shared band of frequencies may include 2.4 GHz, 3.5 GHz, 5 GHz, 60 GHz and/or another band of frequencies.

Furthermore, the first communication protocol and the second communication protocol may include two of: Bluetooth, Bluetooth low energy, Zigbee, Z-Wave, LoRaWAN, Thread, 6LoWPAN and an IEEE 802.11-compatible communication protocol.

In some embodiments, the electronic device optionally performs one or more additional operations. For example, the first interface circuit may communicate first packets or frames using the first communication protocol and the one or more used channels, and/or the second interface circuit may communicate second packets or frames using the second communication protocol and the one or more selected channels. The communication by the first interface circuit or the second interface circuit may be concurrent with each other or with another instance, respectively, of the second interface circuit or the first interface circuit in another electronic device.

In some embodiments, one of the first interface circuit and the second interface circuit is coupled to the electronic device using a port in the electronic device, such as a Universal Serial Bus.

Figure 8:
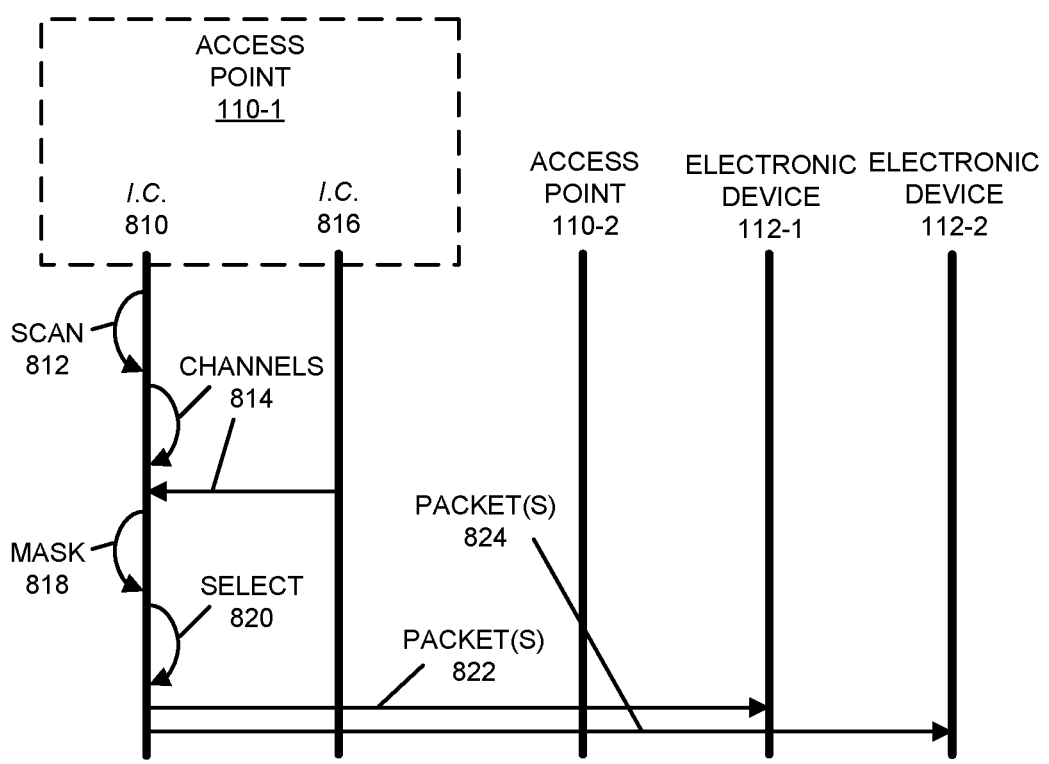
FIG. 8 is a drawing illustrating communication among the electronic devices in FIG. 1 in accordance with an embodiment of the present disclosure.

Embodiments of the communication technique are further illustrated in FIG. 8, which presents a drawing illustrating an example of communication among access points 110-1 and 110-2, and electronic devices 112-1 and 112-2. In particular, interface circuit (I.C.) 810 in access point 110-1 may perform a scan 812 of available channels in a shared band of frequencies using a second communication protocol. Then, interface circuit 810 may determine that there are one or more used channels 814 in the shared band of frequencies that are reserved or used with a first communication protocol, which may be associated with interface circuit 816 in access point 110-1 or access point 110-2.

Alternatively, interface circuit 810 may receive, from interface circuit 816, information specifying the one or more used channels 814 in the shared band of frequencies that are reserved or used by the first communication protocol.

Next, interface circuit 810 may mask 818 the one or more used channels from the available channels, and interface circuit 810 may select one or more channels 820 from remaining available channels for use with the second communication protocol.

In some embodiments, interface circuit 810 may communicate one or more packets 822 or frames to electronic device 112-1 using the second communication protocol, and concurrently, interface circuit 816 may communicate one or more packets 824 or frames to electronic device 112-2 using the first communication protocol.

Figure 9:
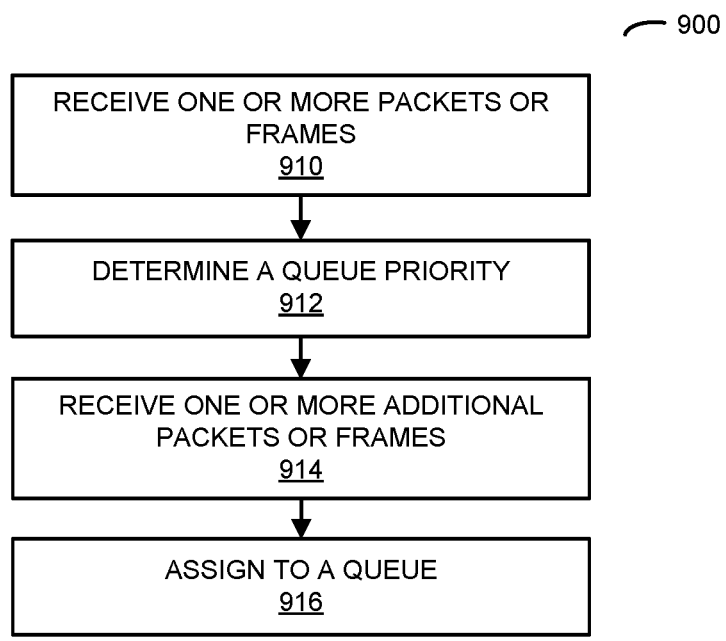
FIG. 9 is a flow diagram illustrating a method for assigning traffic to different queues in one of the electronic devices in FIG. 1 in accordance with an embodiment of the present disclosure.

FIG. 9 presents a flow diagram illustrating an example of a method 900 for assigning traffic to different queues in an electronic device, which may be performed by an electronic device, such as access point 110-1 in FIG. 1. During operation, the electronic device may receive, at an interface circuit in the electronic device, one or more packets or frames (operation 910) associated with another electronic device. Then, the electronic device may determine, based at least in part on information in the one or more packets or frames, a queue priority (operation 912) associated with the other electronic device. When the electronic device receives, at the interface circuit, one or more additional packets or frames (operation 914) associated with the other electronic device, the electronic device may provide additional information, included in the one or more additional packets or frames, to a queue (operation 916) in a set of queues having a latency corresponding to the queue priority.

Note that the electronic device may include an access point or an eNodeB.

Moreover, the set of queues may include a first queue having a first latency and a second queue having a second latency that is smaller than the first latency.

Furthermore, the queue priority may be determined based at least in part on a header in the one or more packets or frames and a stored data structure with characteristics of different electronic devices. For example, the characteristics may include one or more of: an interval between communications with a given electronic device, whether the communications are scheduled, or a type of power source in the given electronic device.

Additionally, the additional information may include a type of data traffic, and the data traffic may be provided to the queue based at least in part on a priority associated with the type of data traffic.

In some embodiments, a first subset of the one or more other electronic devices that have battery power are assigned to the second queue and a remainder of the one or more other electronic devices are assigned to the first queue. However, if the first subset of the one or more electronic devices have a high priority (such as a smoke detector, a carbon-monoxide detector, a burglar alarm, etc.), then the first subset of the one or more electronic devices may be assigned to the first queue and the remainder of the one or more other electronic devices may be assigned to the second queue.

In some embodiments of methods 700 (FIG. 7) and/or 900, there may be additional or fewer operations. Furthermore, the order of the operations may be changed, and/or two or more operations may be combined into a single operation.

Figure 10:
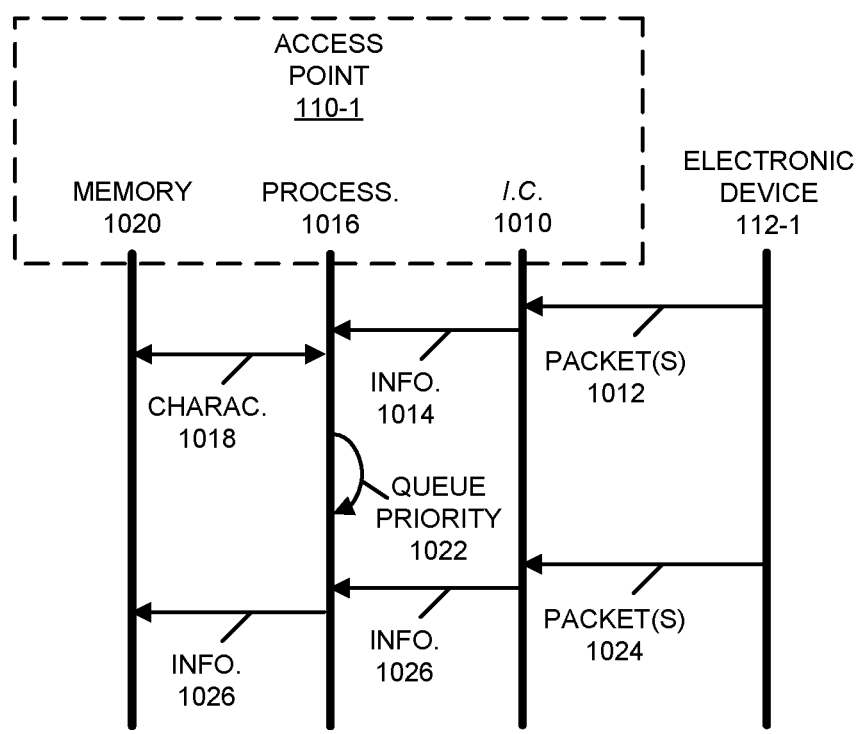
FIG. 10 is a drawing illustrating communication among the electronic devices in FIG. 1 in accordance with an embodiment of the present disclosure.

Embodiments of the communication technique are further illustrated in FIG. 10, which presents a drawing illustrating an example of communication among access point 110-1 and electronic device 112-1. In particular, interface circuit 1010 in access point 110-1 may receive one or more packets 1012 or frames from electronic device 112-1. Information 1014 in the one or more packets or frames 1012 (such as a MAC address or another identifier of electronic device 112-1) may be provided to processor 1016 in access point 110-1. Then, processor 1016 may access one or more characteristics 1018 of electronic device 112-1 stored in memory 1020. Next, processor 1016 may determine, based at least in part on information 1014 and characteristics 1018, a queue priority 1022 associated with electronic device 112-1. When interface circuit 1010 subsequently receives one or more additional packets 1024 or frames from electronic device 112-1, interface circuit 1010 may provide additional information 1026, included in the one or more additional packets or frames 1024, to a queue in a set of queues in memory 1020 having a latency corresponding to queue priority 1022.

We now describe embodiments of an electronic device, which may perform at least some of the operations in the communication technique. FIG. 11 presents a block diagram illustrating an electronic device 1100 in accordance with some embodiments, such as one of access points 110, electronic devices 112, services manager 114 or computers 116. This electronic device includes processing subsystem 1110, memory subsystem 1112, and networking subsystem 1114. Processing subsystem 1110 includes one or more devices configured to perform computational operations. For example, processing subsystem 1110 can include one or more microprocessors, ASICs, microcontrollers, programmable-logic devices, one or more graphics processing units, and/or one or more digital signal processors (DSPs).

Memory subsystem 1112 includes one or more devices for storing data and/or instructions for processing subsystem 1110 and networking subsystem 1114. For example, memory subsystem 1112 can include dynamic random access memory (DRAM), static random access memory (SRAM), and/or other types of memory. In some embodiments, instructions for processing subsystem 1110 in memory subsystem 1112 include: one or more program modules or sets of instructions (such as program module 1122 or operating system 1124), which may be executed by processing subsystem 1110. Note that the one or more computer programs or program modules may constitute a computer-program mechanism. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110.

In addition, memory subsystem 1112 can include mechanisms for controlling access to the memory. In some embodiments, memory subsystem 1112 includes a memory hierarchy that comprises one or more caches coupled to a memory in electronic device 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by electronic device 1100 as fast-access storage for often-used data, while the mass-storage device is used to store less frequently used data.

Networking subsystem 1114 includes one or more devices configured to couple to and communicate on a wired and/or wireless network (i.e., to perform network operations), including: control logic 1116, an interface circuit 1118, an optional cable 1106 and one or more antennas 1120 (or antenna elements), which may be included in an optional antenna module 1130. (While FIG. 11 includes antenna module 1130, in some embodiments electronic device 1100 includes one or more nodes, such as nodes 1108, e.g., a pad, which can be coupled to antenna module 1130. Thus, electronic device 1100 may or may not include antenna modules 1130. Note that the one or more nodes 1108 may constitute input(s) to and/or output(s) from electronic device 1100.) For example, networking subsystem 1114 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, a Zigbee networking system, a Z-Wave networking system, a LoRaWAN networking system and/or another networking system.

Note that a transmit or receive antenna pattern (or antenna radiation pattern) of electronic device 1100 may be adapted or changed using pattern shapers (such as reflectors) in one or more antennas 1120 (or antenna elements), which can be independently and selectively electrically coupled to ground to steer the transmit antenna pattern in different directions. Thus, if one or more antennas 1120 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1100 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting advertising or beacon frames and/or scanning for advertising frames transmitted by other electronic devices as described previously.

Within electronic device 1100, processing subsystem 1110, memory subsystem 1112, and networking subsystem 1114 are coupled together using bus 1128. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, electronic device 1100 includes a display subsystem 1126 for displaying information on a display, which may include a display driver and the display, such as a liquid-crystal display, a multi-touch touchscreen, etc.

Electronic device 1100 can be (or can be included in) any electronic device with at least one network interface. For example, electronic device 1100 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a controller, test equipment, and/or another electronic device.

Although specific components are used to describe electronic device 1100, in alternative embodiments, different components and/or subsystems may be present in electronic device 1100. For example, electronic device 1100 may include one or more additional processing subsystems, memory subsystems, networking subsystems, and/or display subsystems. Additionally, one or more of the subsystems may not be present in electronic device 1100. Moreover, in some embodiments, electronic device 1100 may include one or more additional subsystems that are not shown in FIG. 11. Also, although separate subsystems are shown in FIG. 11, in some embodiments some or all of a given subsystem or component can be integrated into one or more of the other subsystems or component(s) in electronic device 1100. For example, in some embodiments program module 1122 is included in operating system 1124 and/or control logic 1116 is included in interface circuit 1118.

Moreover, the circuits and components in electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1114. The integrated circuit may include hardware and/or software mechanisms that are used for transmitting wireless signals from electronic device 1100 and receiving signals at electronic device 1100 from other electronic devices. Aside from the mechanisms herein described, radios are generally known in the art and hence are not described in detail. In general, networking subsystem 1114 and/or the integrated circuit can include any number of radios. Note that the radios in multiple-radio embodiments function in a similar way to the described single-radio embodiments.

In some embodiments, networking subsystem 1114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Bluetooth, Ethernet, MQTT and a Wi-Fi communication protocols as illustrative examples, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1122, operating system 1124 (such as a driver for interface circuit 1118) or in firmware in interface circuit 1118. Note that the communication technique may occur while processing system 1110 executes program module 1122. Thus, the communication technique may be implemented at runtime of program module 1122. Alternatively or additionally, at least some of the operations in the communication technique may be implemented in a physical layer, such as hardware in interface circuit 1118.

Moreover, while the preceding discussion illustrated embodiments of the communication technique in which an access point transmits to or receives a frame or a packet from an electronic device, in some embodiments the access point may concurrently transmit to or receive frames or packets from two or more electronic devices. For example, the communication protocol in a WLAN may use orthogonal frequency division multiple access (OFDMA).

Furthermore, the functionality of electronic device 1100 may be implemented using a single electronic device or a group of electronic devices, which may be located at a single location or which may be distributed at disparate geographic locations (such as a cloud-based computing system).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   one or more antenna nodes configured to couple to one or more antennas; and
   a first interface circuit communicatively coupled to at least a first subset of the one or more antenna nodes;
   a second interface circuit communicatively coupled to at least a second subset of the one or more antenna nodes, wherein the first interface circuit is configured to communicate using a first communication protocol and the second interface circuit is configured to communicate using a second communication protocol that is different from the first communication protocol, wherein the first communication protocol and the second communication protocol are each different from a cellular-telephone communication protocol, and wherein the first interface circuit is configured to:
   transmit or receive one or more packets or frames in at least a channel in the shared band of frequencies using the first communication protocol; and
   provide a hold signal or instruction to the second interface circuit so that the second interface circuit temporarily does not communicate using at least the channel while the first interface circuit transmits or receives the one or more packets or frames.

2. The electronic device of claim 1, wherein the first communication protocol and the second communication protocol use a contention-based channel access protocol.

3. The electronic device of claim 2, wherein the contention-based channel access protocol comprises carrier-sense multiple access with contention avoidance.

4. The electronic device of claim 1, wherein the electronic device comprises one of: an access point, or an eNodeB.

5. The electronic device of claim 1, wherein the shared band of frequencies comprises 2.4 GHz.

6. The electronic device of claim 1, wherein the first communication protocol and the second communication protocol comprise two of: Bluetooth, Bluetooth low energy, Zigbee, Z-Wave, LoRaWAN, Thread, 6LoWPAN and an IEEE 802.11-compatible communication protocol.

7. The electronic device of claim 1, wherein the first interface circuit and the second interface circuit are configured to communicate one or more packets or frames addressed to the one or more other electronic devices at the same time.

8. The electronic device of claim 1, wherein the electronic device comprises a port; and
wherein one of the first interface circuit or the second interface circuit is coupled to the port.

9. The electronic device of claim 8, wherein the port comprises a Universal Serial Bus.

10. A non-transitory computer-readable storage medium for use in conjunction with an electronic device, the computer-readable storage medium storing program instructions that, when executed by the electronic device, cause the electronic device to perform one or more operations comprising:
transmitting from a first interface circuit in the electronic device or receiving at the first interface circuit one or more packets or frames in at least a channel in the shared band of frequencies using a first communication protocol; and
providing a hold signal or instruction to a second interface circuit in the electronic device so that the second interface circuit temporarily does not communicate using at least the channel while the first interface circuit transmits or receives the one or more packets or frames, wherein the second interface circuit communicates using a second communication protocol that is different from the first communication protocol, and
wherein the first communication protocol and the second communication protocol are each different from a cellular-telephone communication protocol.

11. The non-transitory computer-readable storage medium of claim 10, wherein the first communication protocol and the second communication protocol use a contention-based channel access protocol.

12. The non-transitory computer-readable storage medium of claim 11, wherein the contention-based channel access protocol comprises carrier-sense multiple access with contention avoidance.

13. The non-transitory computer-readable storage medium of claim 10, wherein the electronic device comprises one of: an access point, or an eNodeB.

14. The non-transitory computer-readable storage medium of claim 10, wherein the shared band of frequencies comprises 2.4 GHz.

15. The non-transitory computer-readable storage medium of claim 10, wherein the first communication protocol and the second communication protocol comprise two of: Bluetooth, Bluetooth low energy, Zigbee, Z-Wave, LoRaWAN, Thread, 6LoWPAN and an IEEE 802.11-compatible communication protocol.

16. The non-transitory computer-readable storage medium of claim 10, wherein the first interface circuit and the second interface circuit are configured to communicate one or more packets or frames addressed to the one or more other electronic devices at the same time.

17. A method for performing traffic arbitration, comprising:
by a first interface circuit in an electronic device:
transmitting or receiving one or more packets or frames in at least a channel in the shared band of frequencies using a first communication protocol; and
providing a hold signal or instruction to a second interface circuit in the electronic device so that the second interface circuit temporarily does not communicate using at least the channel while the first interface circuit transmits or receives the one or more packets or frames, wherein the second interface circuit communicates using a second communication protocol that is different from the first communication protocol, and
wherein the first communication protocol and the second communication protocol are each different from a cellular-telephone communication protocol.

18. The method of claim 17, wherein the first communication protocol and the second communication protocol use a contention-based channel access protocol.

19. The method of claim 18, wherein the contention-based channel access protocol comprises carrier-sense multiple access with contention avoidance.

20. The method of claim 17, wherein the electronic device comprises one of: an access point, or an eNodeB.

\* \* \* \* \*